United States Patent [19]

Nagai

[11] Patent Number: 5,799,295
[45] Date of Patent: Aug. 25, 1998

[54] CONSTRAINT-BASED SPREADSHEET SYSTEM CAPABLE OF DISPLAYING A PROCESS OF EXECUTION OF PROGRAMS

[75] Inventor: Yasuo Nagai, Tokyo, Japan

[73] Assignee: Kabushiki Kaisha Toshiba, Kawasaki, Japan

[21] Appl. No.: 966,741

[22] Filed: Nov. 10, 1997

Related U.S. Application Data

[63] Continuation of Ser. No. 365,803, Dec. 29, 1994, abandoned.

[30] Foreign Application Priority Data

Dec. 29, 1993 [JP] Japan ................................. 5-349605

[51] Int. Cl.$^6$ ................................................. G06F 15/18
[52] U.S. Cl. ........................... 706/46; 706/45; 706/48
[58] Field of Search ............................ 305/80, 86, 118; 706/54, 48

[56] References Cited

U.S. PATENT DOCUMENTS

| | | | |
|---|---|---|---|
| 5,055,998 | 10/1991 | Wright et al. | 364/200 |
| 5,175,700 | 12/1992 | Vogel et al. | |
| 5,195,172 | 3/1993 | Elad et al. | 395/50 |
| 5,276,607 | 1/1994 | Harris et al. | 364/401 |
| 5,446,652 | 8/1995 | Peterson et al. | 364/578 |
| 5,479,593 | 12/1995 | Brewer et al. | 395/141 |
| 5,499,180 | 3/1996 | Ammirato et al. | 364/419.1 |
| 5,510,980 | 4/1996 | Peters | 364/406 |
| 5,544,262 | 8/1996 | Pagallo | 382/189 |

OTHER PUBLICATIONS

Constraint And Declarative Languages For Engineering Applications: The TK!Solve Contribution, IEEE vol. 73, No. 12, pp. 1791–1806, Milos Konopasek and Sundaresan Jayaraman, Dec. 1985.

Graphical Techniques in a Spreadsheet For Specifying User Interfaces, SIGCHI' 91, pp. 243–249, Brad A. Myers, 1991.

*Primary Examiner*—Tariq R. Hafiz
*Attorney, Agent, or Firm*—Oblon, Spivak, McClelland, Maier & Neustadt, P.C.

[57] ABSTRACT

A constraint-based spreadsheet system includes a direction discrimination section, a dependence information generating section, a program execution process information generating section, and a display section. The direction discrimination section discriminates whether constraint information, which corresponds to a formula which is a basic structural element of a program, has direction of calculation. The dependence information generating section generates dependence information between tables and within a table based on the direction of calculation discriminated by the direction discrimination section. The program execution process information generating section generates program execution process information using the dependence information. The display section displays the program execution process information.

19 Claims, 18 Drawing Sheets

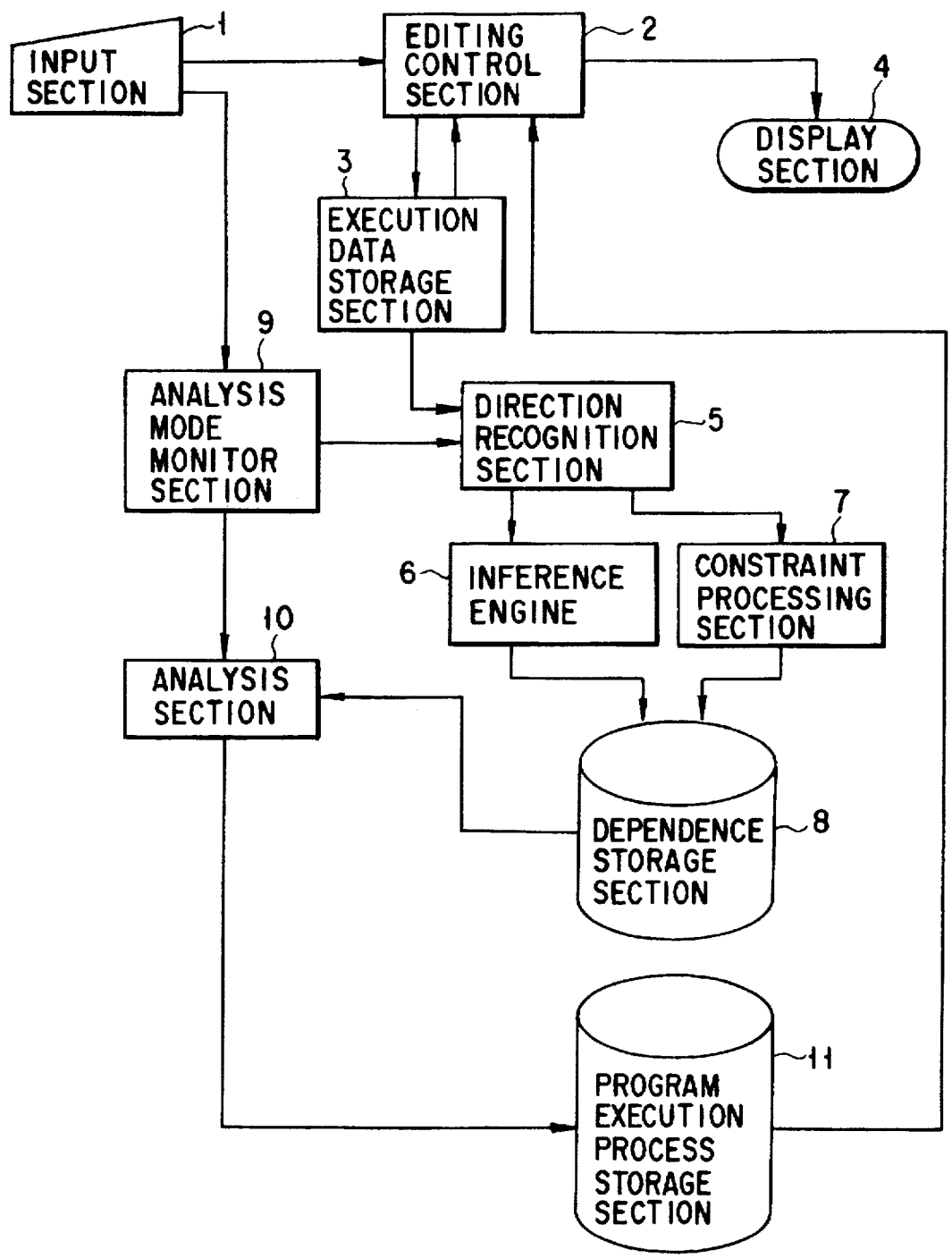
F I G. 1

|   | A | B |
|---|---|---|
| 1 | TABLE X : | |
| 2 | | B2 |
| 3 | | B3 |
| 4 | | B4 |
| 5 | | B5 |
| 6 | CONSTRAINT : | B2+B3=B4 |
| 7 | | B2-B3=B5 |
| 8 | | |
| 9 | TABLE Y : | |
| 10 | | B10 |
| 11 | | B11 |
| 12 | CONSTRAINT : | X:B2+X:B3=B10 |
| 13 | | X:B4+X:B5=B11 |

400 DISPLAY SCREEN

F I G. 2

FIG. 3A
```
DIRECTION   IS DETERMINED
  (TABLE X
    ( ( IN (B2=4, B3=10 ) )      : INPUT INFORMATION
      ( OUT (B4=14 ) )           : OUTPUT INFORMATION
      (B2+B3→B4 ) )              : DIRECTION
  )                                INFORMATION
```

FIG. 3B
```
DIRECTION   IS NOT DETERMINED
  (TABLE X
    ( ( IN (B4=3, B5=2 ) )       : INPUT INFORMATION
      ( OUT (B2=3, B3=-1 ) )     : OUTPUT INFORMATION
      (B2-B3=B5,                 : DIRECTION
        B2+B3=B4 ) )               INFORMATION
  )
```

{ INPUT VALUES 4 AND 10 ARE GIVEN TO CELLS B2 AND B3
IN TABLE X, RESPECTIVELY (TABLE X                        (TABLE Y
 ((IN(B2=4,B3=10))               ((IN(X:B2=4,X:B3=10, X:B4=14,X:B5=-6))
  (OUT(B4=14,B5=-6))              (OUT(B10=14, B11=8))
  (B2+B3 → B4                     (X:B2+X:B3 → B10
   B2-B3 → B5))                    X:B4+X:B5 → B11))
)                               )
DEPENDENCE                      DEPENDENCE
INFORMATION                     INFORMATION
IN TABLE X                      IN TABLE Y

FIG. 4A

{ INPUT VALUES 3 AND 2 ARE GIVEN TO CELLS B4 AND B5
IN TABLE X, RESPECTIVELY (TABLE X                        (TABLE Y
 ((IN(B4=3,B5=2))                ((IN(B2=2.5,B3=0.5,B4=3,B5=2)
  (OUT(B2=2.5,B3=0.5))            (OUT(B10=3, B11=5))
  (B2-B3 =B5,                     (X:B2+X:B3 → B10
   B2+B3 =B4))                     X:B4+X:B5 → B11))
)                               )
DEPENDENCE                      DEPENDENCE
INFORMATION                     INFORMATION
IN TABLE X                      IN TABLE Y

FIG. 4B

400 DISPLAY SCREEN

INFORMATION BETWEEN TABLES

TABLE SET DEFINED AS PROGRAM
 CALLING RELATIONSHIP

TABLE SET USED FOR EXECUTION OF PROGRAMS
 CALLING RELATIONSHIP

INFORMATION WITHIN TABLE

CELL
  CONSTRAINT
  DEPENDENCE INFORMATION

CELL INFORMATION

CELL VALUE
  MODE INFORMATION

CONSTRAINT SET

VARIABLE SET
  MODE INFORMATION
  DIRECTION INFORMATION

DEPENDENCE SET

CONSTRAINT SET
  VARIABLE SET

FIG. 7

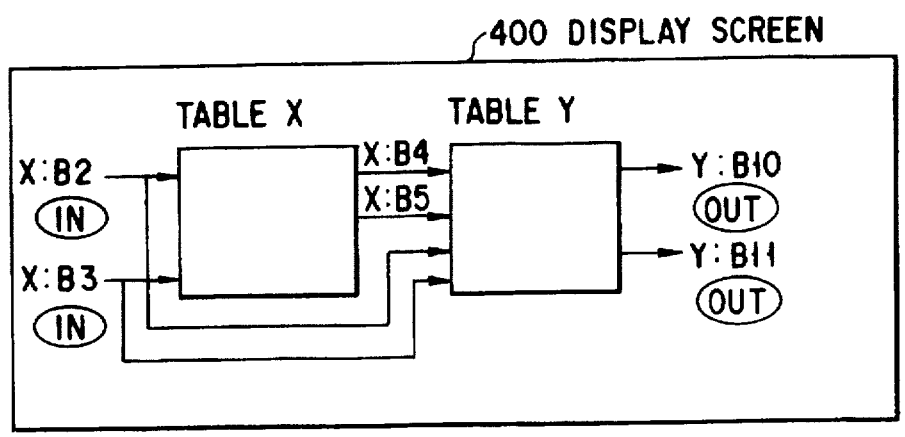
F I G. 9A
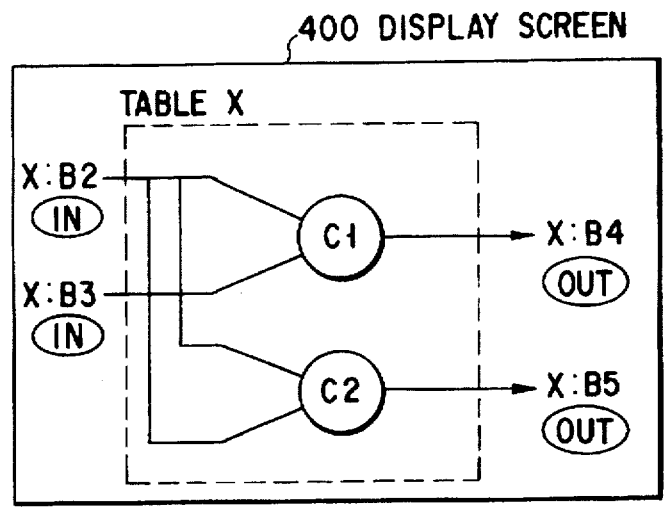
F I G. 9B
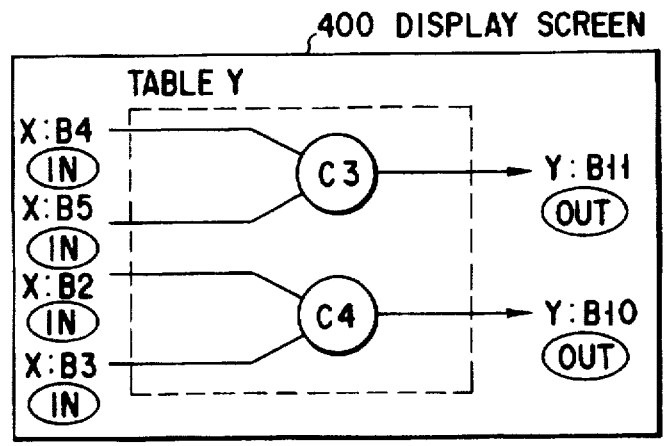
F I G. 9C

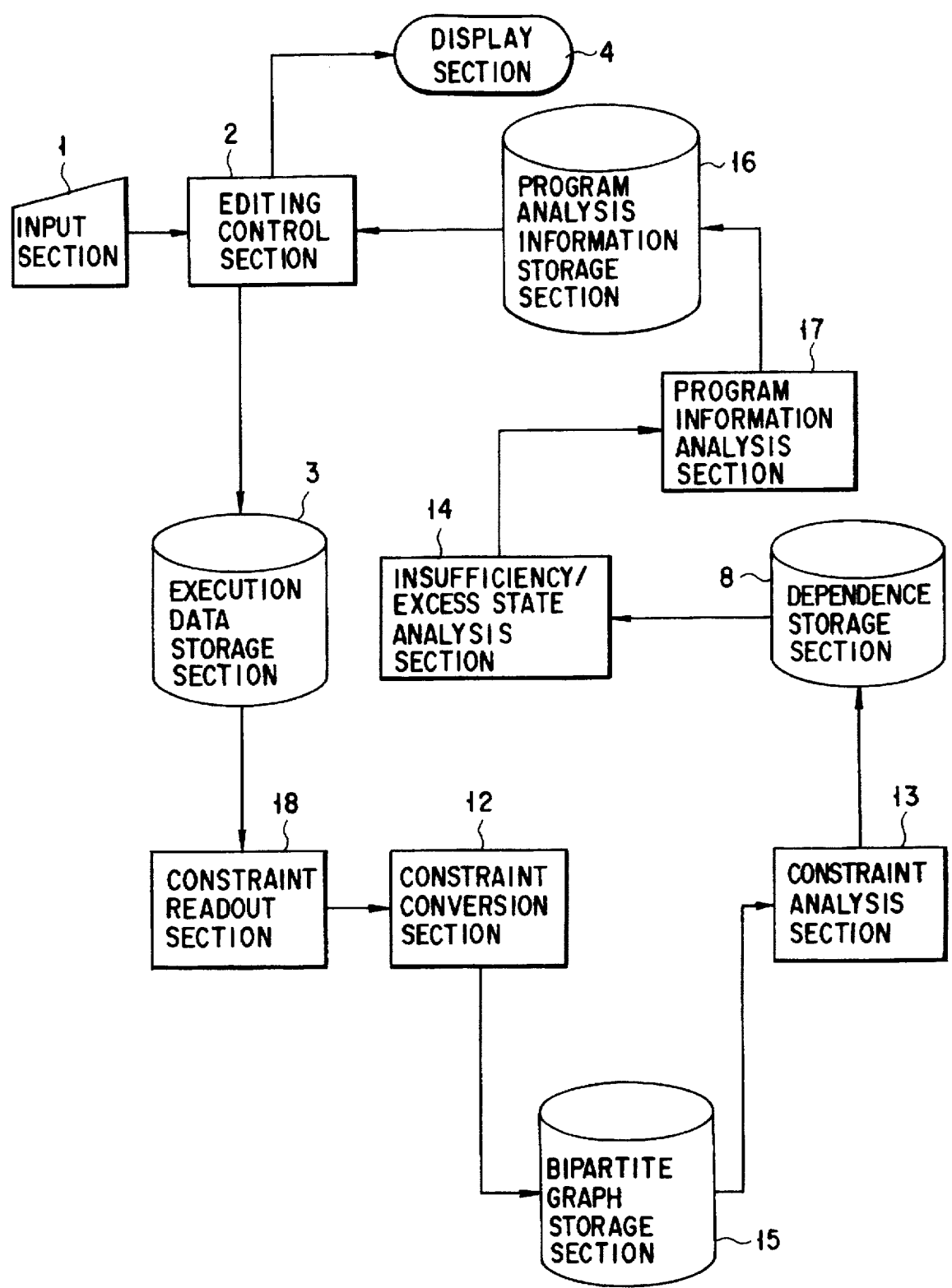
F I G. 11

$\{B2+B3=B4, B2-B3=B5, X:B2+X:B3=B10,$
$X:B4+X:B5=B11\}$

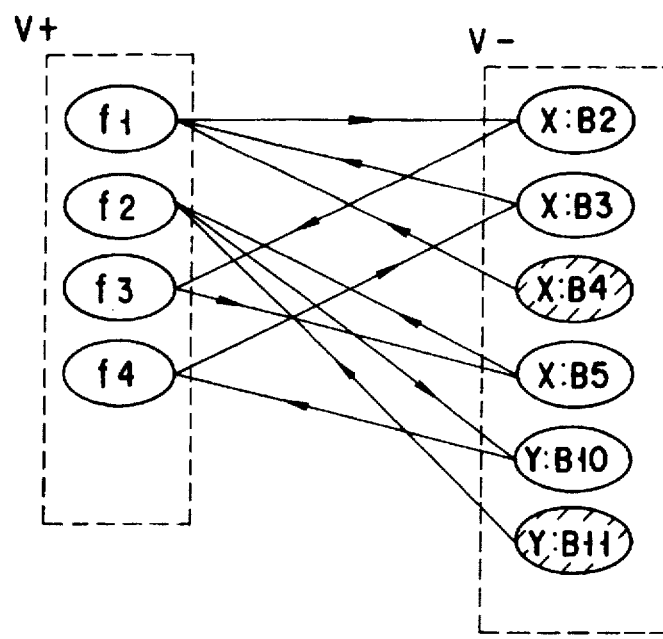
F I G. 14A
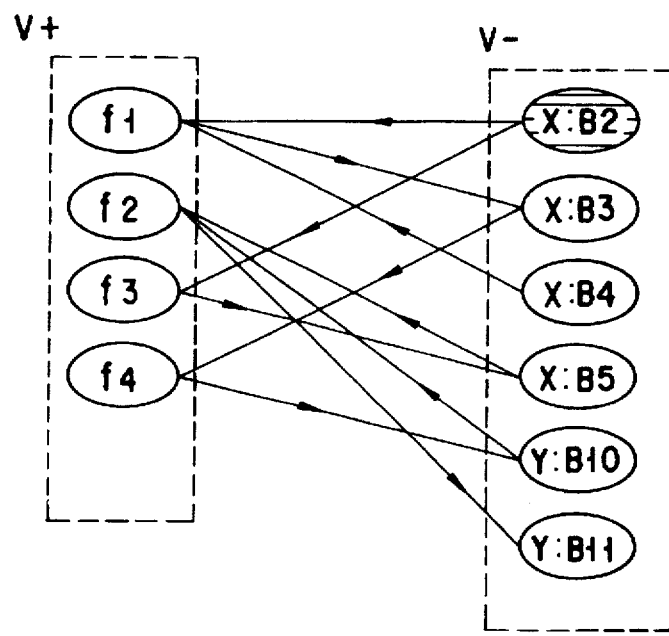
F I G. 14B

400 DISPLAY SCREEN

INFORMATION BETWEEN TABLES
    TABLE SET DEFINED AS PROGRAM
                CALLING RELATIONSHIP
    TABLE SET PLANNED FOR EXECUTION OF PROGRAM
                CALLING RELATIONSHIP

INFORMATION WITHIN TABLE
    CELL
    CONSTRAINT
    DEPENDENCE INFORMATION

CELL INFORMATION
    CELL VALUE
    INPUT VARIABLE (IN)
    OUTPUT VARIABLE (OUT)

CONSTRAINT INFORMATION
    VARIABLE SET
    CONSTRAINT INFORMATION
    EDGE INFORMATION

DEPENDENCE SET
    CONSTRAINT SET
    LABELING INFORMATION

INSUFFICIENCY / EXCESS STATE INFORMATION
    INPUT VARIABLE SET
    CONSTRAINT SET
    INSUFFICIENCY / EXCESS INFORMATION
    OUTPUT VARIABLE SET

FIG. 17

{ INPUTS :: X:B2 , X:B3

CONSTRAINT SET ::

TABLE X

B2 + B3 = B4

B2 − B3 = B5

TABLE Y

X:B2 + X:B3 = B10

X:B4 + X:B5 = B11

CONSTRAINT SET IS SATISFIABLE

OUTPUTS :: X:B4 , X:B5 , Y:B10 , Y:B11 }

{ INPUTS :: X:B4, X:B5

CONSTRAINT SET ::

TABLE X

B2 + B3 = B4

B2 − B3 = B5

TABLE Y

X:B2 + X:B3 = B10

X:B4 + X:B5 = B11

CONSTRAINT SET IS SATISFIABLE, HOWEVER SIMULTANEOUS EQUATIONS HAVE TO BE SOLVED

OUTPUTS :: X:B2, X:B3, Y:B10, Y:B11 }

{ INPUT ∷ X:B2
CONSTRAINT SET ∷
   TABLE X
      B2 + B3 = B4
      B2 - B3 = B5
   TABLE Y
      X:B2 + X:B3 = B10
      X:B4 + X:B5 = B11
CONSTRAINT SET IS UNDERCONSTRAINED
VALUE SHOULD BE GIVEN TO X:B4
OUTPUTS ∷ X:B3, X:B5, Y:B10, Y:B11
F I G. 21
{ INPUTS ∷ X:B2, X:B4, X:B5
CONSTRAINT SET ∷
   TABLE X
      B2 + B3 = B4
      B2 - B3 = B5
   TABLE Y
      X:B2 + X:B3 = B10
      X:B4 + X:B5 = B11
CONSTRAINT SET IS OVERCONSTRAINED
{B2+B3=B4, B2-B3=B5}
INPUT VALUE OF VARIABLE X:B2 IS
LIKELY TO BE REDUNDANT OR CONTRADICTORY
F I G. 22

CONSTRAINT-BASED SPREADSHEET SYSTEM CAPABLE OF DISPLAYING A PROCESS OF EXECUTION OF PROGRAMS

This application is a Continuation of application Ser. No. 08/365,803, filed on Dec. 29, 1994, now abandoned.

BACKGROUND OF THE INVENTION

1. Field of the Invention

The present invention relates to a spreadsheet system and, more specifically, to a constraint-based spreadsheet system and a method for displaying a process of execution of programs.

2. Description of the Related Art

A general spreadsheet system causes a planning simulation for business administration and the like to be executed by a computer using a spreadsheet with squares for accumulating and calculating information. This simulation is achieved by providing each cell with a series of items of computer information.

Since the computer information is usually serially evaluated in a predetermined direction, a user has to determine in advance the direction of the evaluation such that the cell has a value showing a correct result of the evaluation. If, therefore, a user wishes to describe a formula expressing certain information, he or she has to consider how to solve the formula in advance and, in other words, the user is required to describe computation procedures in sequence and determine (constrain) the direction of the computation.

If the procedures of computation are described, the computation assumes a direction. Thus, in order to enable bidirectional computation, a number of computation rules have to be described, and accordingly a high degree of knowledge is required (as shown in, for example, Computer Software Lexicon, pp. 358-366) MARUZEN, 1990 (In Japanese).

It is known that constraint programming has a strong affinity with the constraint-based spreadsheet system since the order of constraint processing does not influence an obtained solution. The constraint programming is featured in that a user simply describes an objective and need not describe any specific algorithm as to how the objective is attained.

Consequently, the spreadsheet system provides a flexible environment wherein a relationship between declarative targets having high-level description ability can be expressed, as the constraint programming having the above feature does. (Wm Leler, "Constraint Programming Languages: Their Specification and Generation, Existing Constraint Languages," Addison-Wesley Publisher Company, 1988, chap. 4, pp. 69-86).

Though the foregoing constraint-based spreadsheet system describes languages well, it has a drawback in which a user has a difficulty in control of all programs and in debug, since a constraint processing section is considered as a black box.

Assume a constraint relationship where the multiplication of a value of cell A and that of cell B is equal to a value of cell C. In this case (A*B=C), the value of cell C is calculated by determining the values of cells A and B. However, the value of cell C can be determined before the values of cells A and B are determined.

In the constraint-based spreadsheet system, in accordance with how a value of a cell is determined as an input, a constraint processing section of the system determines a value of another cell so as to satisfy a constraint relationship between cells. A user was not able to see the process of determining the values of the cells at all. It was therefore difficult to understand the order of computation when the values of cells were increased or the computation was performed with respect to multiple spreadsheets having a constraint relationship. For example, it was difficult to know from what cell value the value of a certain cell was extracted.

When the constraint information handled by the constraint processing section is insufficient or excessive, a user has to take appropriate measures. Conventionally, however, there were no user interfaces for analyzing and displaying the insufficiency or excess of the constraint information.

SUMMARY OF THE INVENTION

A first object of the present invention is to provide a constraint-based spreadsheet system capable of performing an efficient programming operation by offering a user information on a process of execution of programs, which is indispensable to debugging, such as information on the direction of calculation of constraints between tables and within a table, and a method of displaying the information.

A second object of the present invention is to provide a constraint-based spreadsheet system capable of facilitating satisfaction of constraints for programming by determining the insufficiency/excess state of constraint information at the time of execution of a spreadsheet and offering a user a result of the determination, and a method of displaying the result.

To attain the above first object, there is provided a constraint-based spreadsheet system comprising:

discrimination means for discriminating whether constraint information has direction of calculation, the constraint information corresponding to a formula which is a basic structural element of a program;

first generating means for generating dependence information between tables and within a table based on the direction of calculation discriminated by the discrimination means;

second generating means for generating program execution process information using the dependence information generated by the first generating means; and display means for displaying the program execution process information, generated by the second generating means, in a predetermined display fashion.

Furthermore, there is provided a method of displaying the program execution process information in the constraint-based spreadsheet system, comprising:

a discrimination step of discriminating whether constraint information has direction of calculation, the constraint information corresponding to a formula which is a basic structural element of a program;

a first generating step of generating dependence information between tables and within a table based on the direction of calculation discriminated in the discrimination step;

a second generating step of generating program execution process information using the dependence information generated in the first generating step; and a display step of displaying the program execution process information, generated in the second generating step.

To attain the above second object, there is provided a constraint-based spreadsheet system comprising:

constraint readout means for obtaining a constraint information set, which is to be used for execution of a program, based on constraint information corresponding to a formula which is a basic structural element of the program;

constraint analysis means for obtaining dependence information of the constraint information between tables and within a table while applying a predetermined rule to the constraint information set obtained by the constraint readout means;

insufficiency/excess state analysis means for analyzing an insufficiency/excess state of the constraint information based on the dependence information obtained by the constraint analysis means; and display means for displaying the insufficiency/excess state of the constraint information analyzed by the insufficiency/excess state analysis means.

Furthermore, there is provided a method of displaying the program execution process information in the constraint-based spreadsheet system, comprising:

a constraint readout step of obtaining a constraint information set, which is to be used for execution of a program, based on constraint information corresponding to a formula which is a basic structural element of the program;

a constraint analysis step of obtaining dependence information of the constraint information between tables and within a table while applying a predetermined rule to the constraint information set obtained in the constraint readout step;

an insufficiency/excess state analysis step of analyzing an insufficiency/excess state of the constraint information set based on the dependence information obtained in the constraint analysis step; and a display step of displaying the insufficiency/excess state of the constraint information set analyzed in the insufficiency/excess state analysis step.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing a structure of a constraint-based spreadsheet system according to a first embodiment of the present invention;

FIG. 2 is a view specifically showing cells of a table;

FIGS. 3A and 3B are views showing the dependence of constraint information among cells within a table and cells between tables in both cases where the direction is determined and it is not determined;

FIGS. 4A and 4B are views showing dependence information of all programs obtained from the dependence of constraint information shown in FIGS. 3A and 3B;

FIG. 7 is a view showing a display menu by which a user selects desired program execution process information;

FIGS. 9A to 9C are views each showing an example of displaying the program execution process information in case 1;

FIG. 11 is a block diagram showing a structure of a constraint-based spreadsheet system according to a second embodiment of the present invention;

FIGS. 14A and 14B are views of labeled constraint information;

FIG. 17 is a view showing a display menu from which program analysis information including information on an insufficiency/excess state is selected;

FIG. 21 is a view of an example of displaying the insufficiency/excess state when an input value is given to still another cell variable; and FIG. 22 is a view of an example of displaying the insufficiency/excess state when an input value is given to yet another cell variable.

DETAILED DESCRIPTION OF THE PREFERRED EMBODIMENTS

Figure 5:
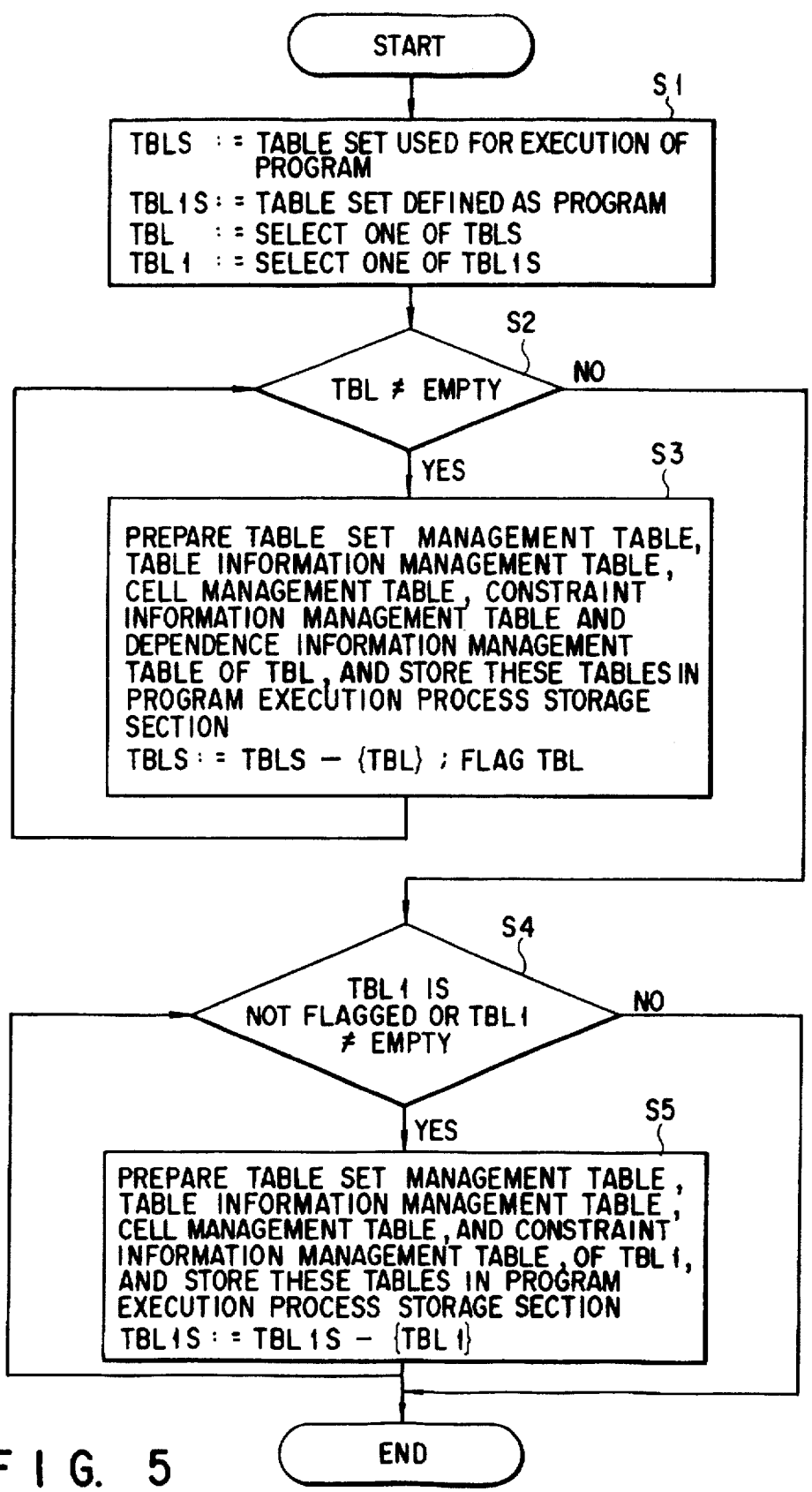
FIG. 5 is a flowchart showing a process of generating the process information of program execution from the dependence information in an analysis section.

Embodiments of the present invention will now be described, with reference to the accompanying drawings.

FIG. 1 is a block diagram showing a structure of a constraint-based spreadsheet system according to a first embodiment of the present invention. As shown in FIG. 1, constraint information including the values of cells and the relationship between the cells supplied from an input section 1, which are represented by numeric expressions corresponding to fundamental constituents of programs, is stored in an execution data storage section 3 under control of an editing control section 2. The constraint information is also displayed on a display screen 400 of a display section 4 in the form of a table including of cells surrounded with ruled lines. In this table, the cells are referred to by coordinates of rows and columns. To refer to a cell of another table, the name of the table and the coordinate of the cell are required.

The cells can be used as cell variables. For example, "X: A1" represents a cell variable in row 1 and column A of table X. FIG. 2 shows table X in which cell variables are B2, B3, B4 and B5 and constraint information among the cell variables is that $B2+B3=B4$ and $B2-B3=B5$, and table Y in which cell variables are B10 and B11 and constraint information is that $X: B2+X: B3=B10$ and $X: B4+X: B5=B11$.

Returning to FIG. 1, a direction discrimination section 5 reads the constraint information stored in the execution data storage section 3 to discriminate whether the constraint information has a direction (or to discriminate whether the direction of the constraint information is determined). When the value of the constraint information is restricted by (n−1) of n cell variables within the constraint information, and the information can be executed as a function or a procedure without transforming the numeric expression thereof, the direction discrimination section 5 determines that the constraint information has a direction. In this case, an inference engine 6 executes the constraint information as a substitution.

If the value of the constraint information is restricted only by (n−2) or less of the n cell variables, the information cannot be executed as a function or a procedure. Therefore, the direction discrimination section 5 determines that the constraint information does not have a direction. The information free from direction is transmitted to a constraint processing section 7, and considered to be simultaneous equations. The constraint information is thus processed to remove the constraint therefrom.

The constraint information processed by the inference engine 6 or constraint processing section 7, is stored in a dependence storage section 8 as dependence information of constraint information indicative of the relationship among cells only within a table and that indicative of the relationship among cells covering several tables, as shown in FIGS. 3A and 3B.

FIG. 4A shows dependence information including both direction information (B2+B3→B4), which is obtained by the direction discrimination section 5 and inference engine 6 from input information 4 and 10 given to cell variables B2 and B3 of table X in FIG. 2 (B2=4, B3=10), and output information (B4=14). The dependence information represents that cell B4 is calculated by using (or referring to) cell variables B2 and B3.

FIG. 4B shows dependence information generated when the direction cannot be determined by the direction discrimination section 5 from input information 3 and 2 given to cells B4 and B5 of table X (B4=3, B5=2) and the constraint is removed using simultaneous equations by the constraint processing section 7. This dependence information includes both a constraint information set {B2−B3=B5, B2+B3=B4} and output information (B2=2.5, B3=0.5).

Figure 6:
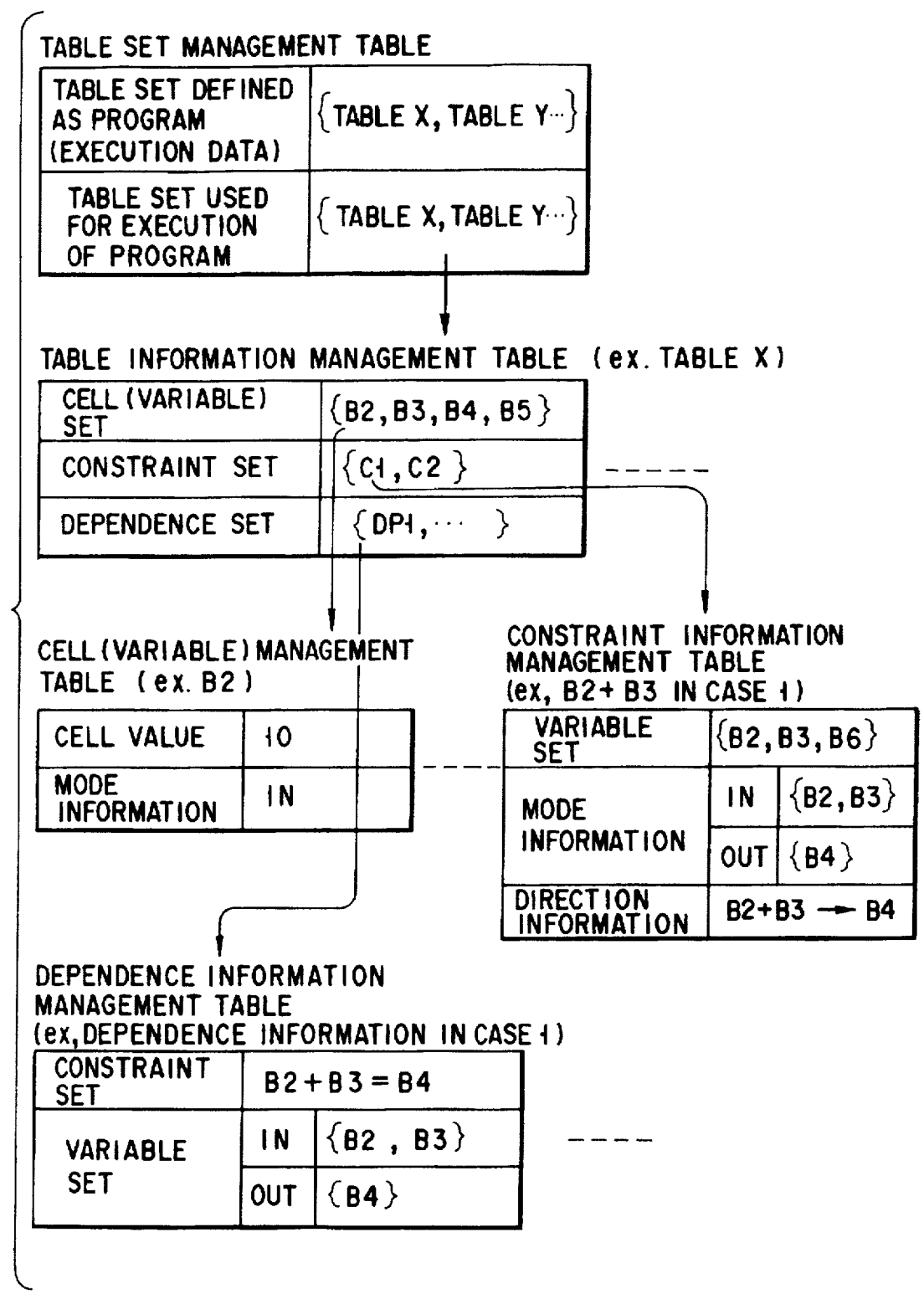
FIG. 6 is a view of tables representing the process information of the program execution generated in the analysis section.

If a user inputs a display command from the input section 1 based on a display menu displayed on the display screen of the display section 4, an analysis mode monitor section 9 interprets the command and reports it to an analysis section 10. In accordance with the flowchart shown in FIG. 5, the analysis section 10 generates a table set management table, a table information management table, a cell (variable) management table, a constraint information management table, and a dependence information management table, each having a data structure as shown in FIG. 6, from the dependence information within each table stored in the dependence storage section 8 and the dependence information between tables stored therein. These tables are considered to be program execution process information.

First one element TBL1 is selected from a table set (TBL1S) defined as a program, and one element TBL is selected from a table set (TBLS) used for execution of programs (step S1). It is then determined whether or not the element TBL is empty (empty set). If not, a table set management table, a table information management table, a cell management table, a constraint information management table, and a dependence information management table are prepared and stored in a program execution process storage section 11, and TBLS−{TBL} is substituted into TBLS and the TBL is flagged (steps S2 and S3). The processing of step S3 is continued until the TBL becomes empty. When the TBL becomes empty, the flow jumps to step S4.

In step S4, it is determined whether TBL1 is flagged or not and whether TBL1 is empty or not. If TBL1 is neither flagged nor empty, a table set management table, a table information management table, a cell management table, and a constraint information management table, are prepared and stored in the program execution process storage section 11, and TBL1S−{TBL1} is substituted into TBL1S (step S5).

The processing of step S5 is continued until TBL1 is both flagged and empty.

Each of the tables so produced has an arrangement as shown in FIG. 6. More specifically, the table set management table includes a row showing a table set defined as a program and a row showing a table set used for execution of the program. The table information management table includes a row indicating a cell (variable) set including a table, a row indicating a constraint set defined in the table, and a row showing a dependence set, and is managed by a table name. The cell (variable) information management table includes a row indicating a cell value and a row indicating mode information, and is managed by a cell name. The constraint information management table includes of a row showing a cell (variable) set contained in constraint, a row showing mode information, and a row showing direction information, and is managed by a constraint name. The dependence information management table includes a row showing a constraint set for generating a dependence and a row showing a variable set, and is managed by a dependence name.

The program execution process information is read out from the program execution process storage section 11 by the editing control section 2 in response to a user's display command input from the input section 1 during the intermittence of execution of programs or after the execution of programs, and displayed as menu information on the display screen 400 of the display section 4. This menu information is shown in FIG. 7.

Figure 8:
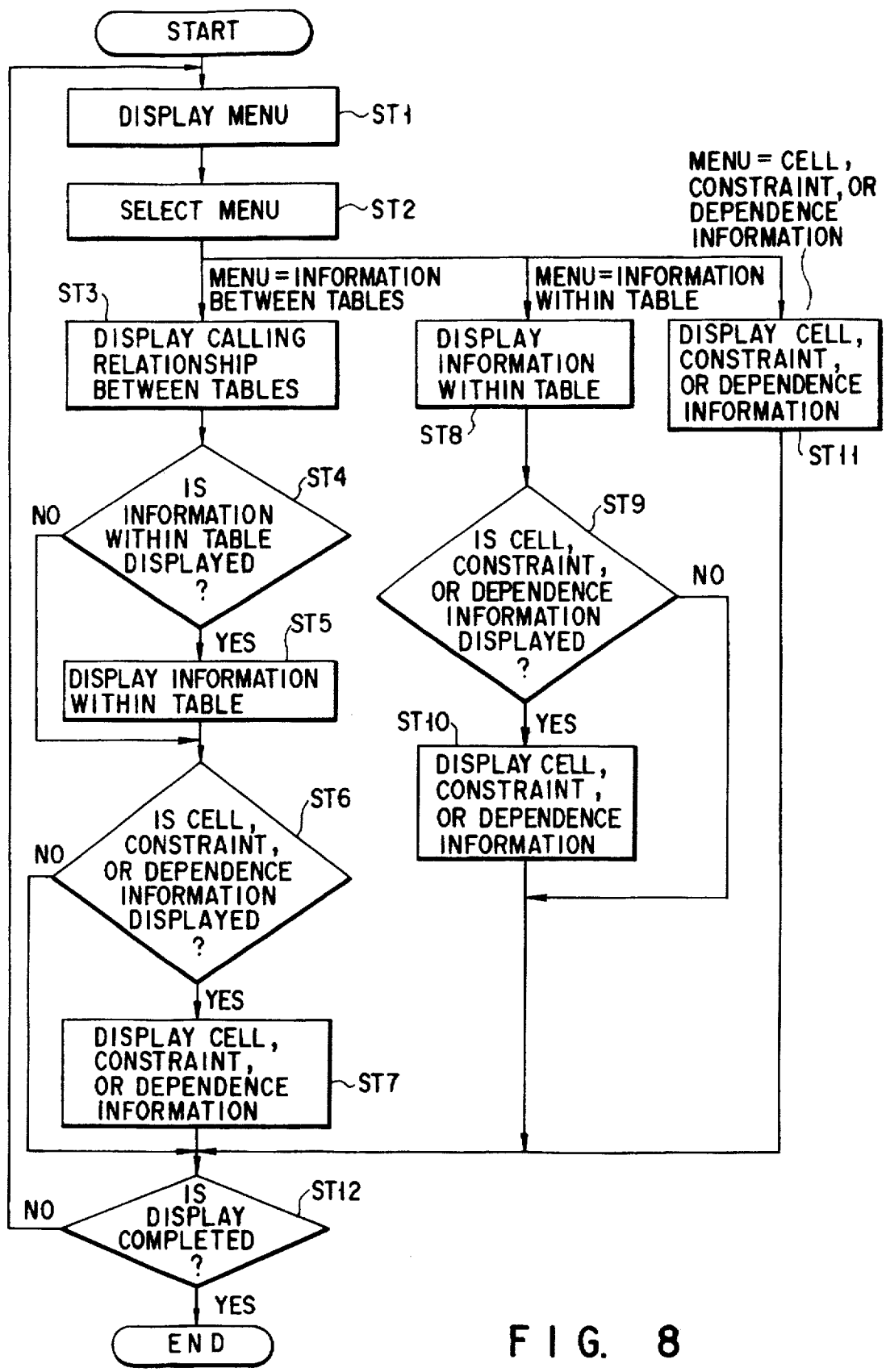
FIG. 8 is a flowchart showing a process of displaying the program execution process information in accordance with the display menu.

That information of the displayed program execution process information which is selected by the user, is displayed on the display section 4. FIG. 8 is a flowchart showing a process of displaying the program execution process information on the section 4.

First a menu is selected referring to the menu information as shown in FIG. 7 (steps ST1 and ST2). If information between tables is selected, a calling relationship between tables is displayed (step ST3), and it is determined whether or not information within a table is displayed (step ST4). If YES in step 4, the information within the table is displayed (step ST5). It is then determined whether cell, constraint, or dependence information is displayed (step ST6). If YES in step ST6, the information is displayed (step ST7). After that, it is confirmed whether or not the display is finished (step ST12). If YES in step ST12, the display operation ends.

When information is selected from the table in step ST2, it is displayed (step ST8). It is then determined whether cell, constraint, or dependence information is displayed (step ST9). If YES in step ST9, the information is displayed (step ST10). After that, it is confirmed whether or not the display is completed (step ST12). If YES in step ST12, the display operation ends.

If cell, constraint, or dependence information is selected in step ST2, this information is displayed immediately (step ST11), and it is confirmed whether or not the display is finished (step ST12). If YES in step ST12, the operation ends.

Figure 10A:
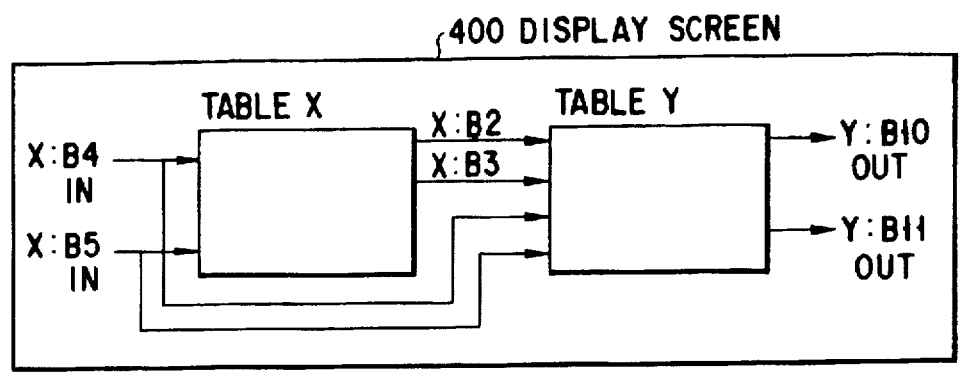
FIGS. 10A to 10C are views each showing an example of displaying the program execution process information in case 2.

FIGS. 9A and 10A are views each showing how the program execution process information is displayed on the screen 400 of the display section 4, and FIGS. 9B–9C and 10B–10C are views showing in detail parts of the views of FIGS. 9A and 10A, respectively.

FIG. 9B shows an example of displaying program execution process information between tables X and Y in case 1 of FIG. 4A, where input information 4 and 10 are supplied to cell variables B2 and B3 in table X, respectively.

FIG. 9C shows an example of displaying of program execution process information within table in the case 1 of FIG. 4A. More specifically, FIG. 9C shows the dependence information of table X, "B2+B3→B4 and B2−B3→B5," and the program execution process information obtained from the dependence information. The program execution process information is represented as input/output information between constraints and information concerning the use of (reference to) cells by using arrows.

Figure 10B:
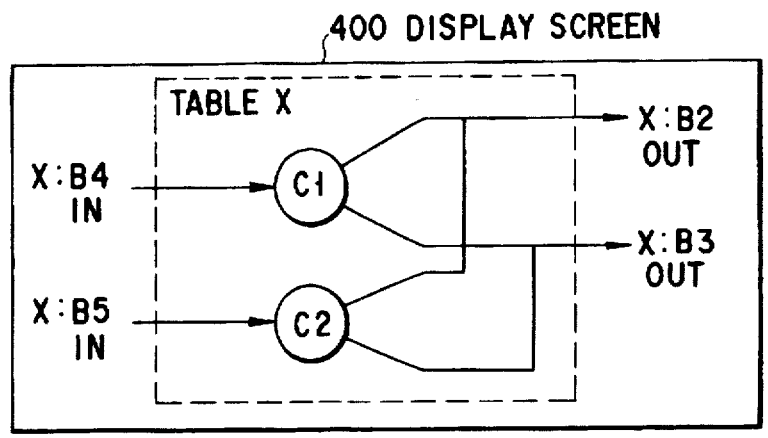

FIG. 10B shows an example of displaying program execution process information between tables X and Y in case 2 of FIG. 4B, where input information 3 and 2 are supplied to cell variables B4 and B5 in table X, respectively.

Figure 10C:
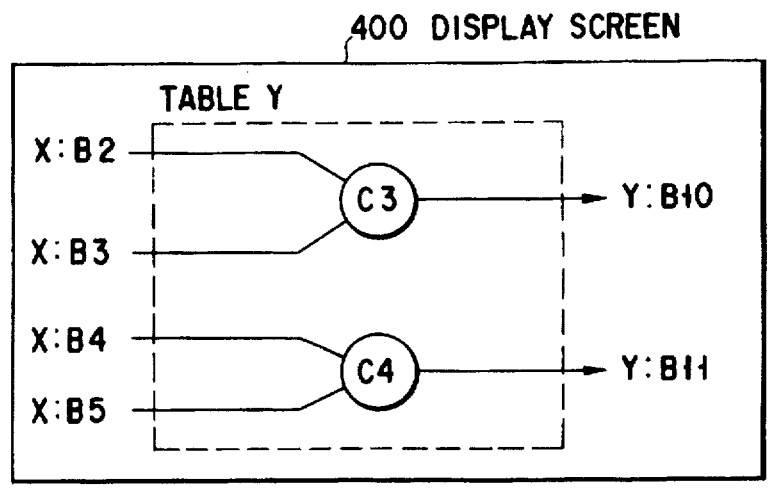

FIG. 10C shows an example of displaying program execution process information within a table. More specifically, it shows information about input/output of cells in each table, the dependence of constraint information, and the calling relationship between the tables (==>).

According to the first embodiment described above, a user can be provided with information concerning a program execution process indispensable to debugging, such as information on the direction of calculation of the constraint between tables and within a table. Consequently, a user's burden is lightened at the time of debugging, and an efficient operation can be performed.

FIG. 11 is a block diagram showing a structure of a constraint-based spreadsheet system according to a second embodiment of the present invention. In FIG. 11, the same components as those of FIG. 1 are indicated by the same reference numerals, and their descriptions are omitted.

Figures 12, 13:
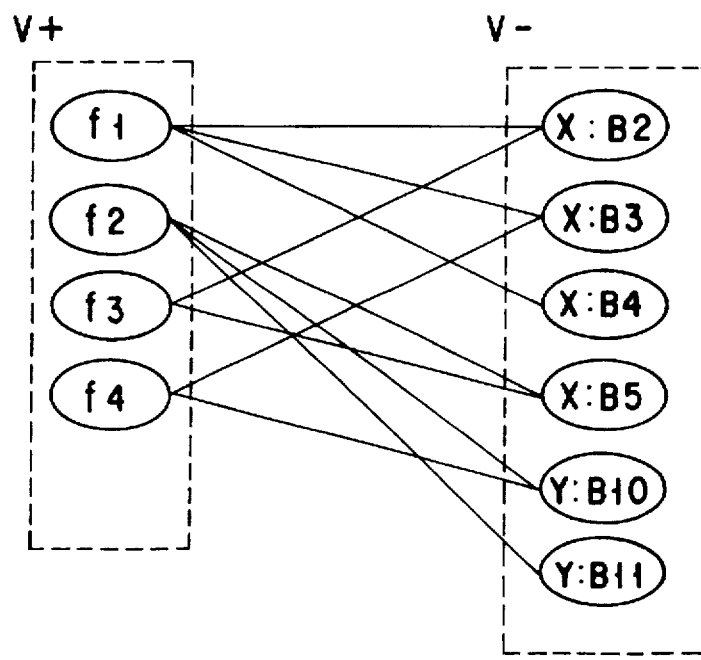
FIG. 12 is a view showing an example of a constraint information set used at the time of execution of a program.
FIG. 13 is a view showing a bipartite graph representing the constraint information set of FIG. 12.

A constraint readout section 18 reads out the constraint information, as shown in FIG. 12, from an execution data storage section 3, and a constraint information set is obtained from the read-out constraint information to use it at the time of execution of programs. FIG. 12 shows the constraint information set, {B2+B3=B4, B2−B3=B5, X: B2+X: B3=B10, X: B4+X: B5=B11}. The constraint information set is used at the time of execution of programs if the input values are given to the cells B2 and B3 in table X of FIG. 2 and to the cells B4 and B5 therein.

A constraint conversion section 12 converts the constraint information set read out from the constraint readout section 18 into a bipartite graph, and stored in a bipartite graph storage section 15. The bipartite graph of the constraint information set is shown in FIG. 13. In FIG. 13, the left-side node set V+ contains node elements indicative of names of the constraint information, and the right-side node set V-includes node elements indicative of variables of the constraint information. For example, the constraint information, "B2+B3=B4 [f1(B2, B3, B4)=0]" is expressed as the relationship between constraint information and variables by the bipartite graph of FIG. 13.

A constraint analysis section 13 is designed to label the edges of the bipartite graph of the constraint set stored in the bipartite graph storage section 15 by employing the following five rules.

1) When the dependence between variables is provided in advance as causality (a function) by an explicit function, a table or the like, it has a first priority as a labeled rule.

2) If a node V− represents an input variable, it has an outward edge (an edge in the output direction) only.

3) If the node set V+ (constraint, predicate, etc.) includes N variables, one edge is set in the output direction, and (N−1) edges are set in the input direction.

4) In the node set V− of the other variables, one edge is set in the input direction, while the remaining edges are set in the output direction.

5) If the relationship of node set V+ including N variables is expressed by an inequality, and a value has to be known to every variable, all edges are set in the input direction. In other words, the nodes representing all the variables are set in the input mode.

The results of labeling are stored in the dependence storage section 8 as dependence information as shown in FIGS. 3A and 3B.

An insufficiency/excess state analysis section 14 computes the number of constraints and that of variables from the dependence information within a table and between tables stored in the dependence storage section 8, i.e., from the common information of variables and constraint information, and analyzes a result of the labeling performed by the constraint analysis section 13. In this analysis section 14, the nodes given as input variables and the outward edges from the nodes are eliminated, and the insufficiency/excess state of the constraint set is determined as to the following three cases.

(a) When the number of constraints and that of variables are equal to each other:

First, based on the result of labeling, a variable node having an outward edge is selected from the node set corresponding to the variables, and the selected node is regarded as a starting point. The labeled edge is then traced from the starting point to check constraint and variable nodes. If all constraint and variable nodes are checked after completion of tracing of the edge, it is determined that constraint is satisfied. If, however, an operation is returned to the variable node of the starting point, that is, if a route following the edge is closed, simultaneous equations have to be solved. If, furthermore, a variable node has only one input edge, it has to be supplied with a value.

(b) When the number of constraints is larger than that of variables:

First a variable node having an outward edge is selected, and the selected node is regarded as a starting point. Then the labeled edge is traced from the starting point to check constraint and variable nodes. If all constraint and variable nodes are checked after completion of tracing of the edge, it is determined that the constraint is satisfiable. If it is possible to return to the variable node of the starting point, simultaneous equations have to be solved. If there is an unchecked constraint node, it is determined that the constraint set is in the excess state and, in this case, the unchecked constraint node is considered to be redundant or contradictory, with the result that its corresponding constraint information needs to be removed in order to satisfy the constraint.

(c) When the number of constraints is smaller than that of the variables:

First a variable node having an outward edge is selected, and the selected node is regarded as a starting point. Then the labeled edge is traced from the starting point to check constraint and variable nodes. If all constraint and variable nodes are checked after completion of tracing of the edge, it is determined that the constraint is satisfied. To return to the variable node of the starting point, simultaneous equations have to be solved. If a variable node has only one input edge as in the case of (a), it is determined that the variable node lacks a constraint, and a value has to be supplied to the variable node.

Figure 15:
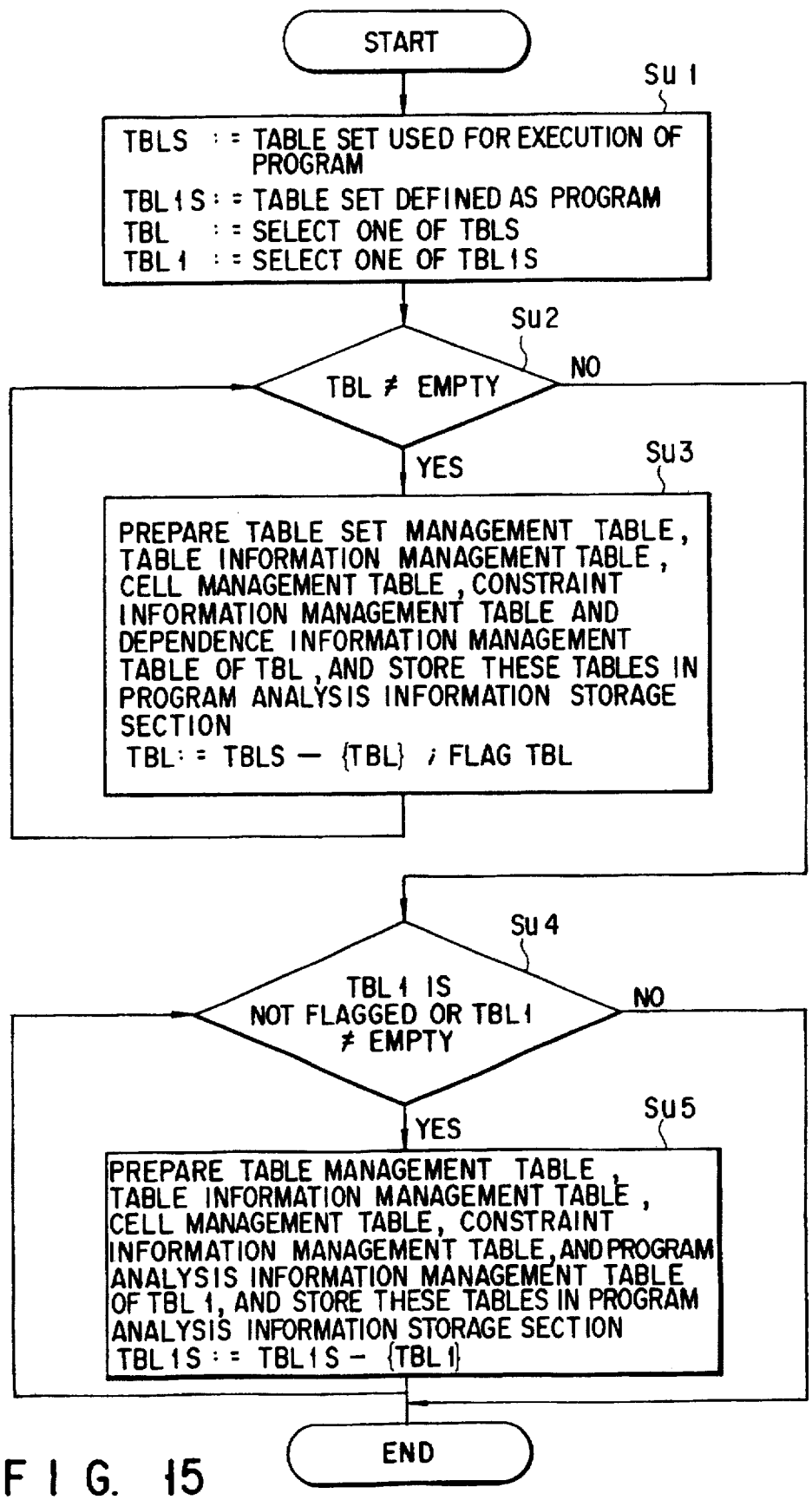
FIG. 15 is a flowchart showing a process of generating program analysis information from the dependence information in a program information analysis section.
Figure 16:
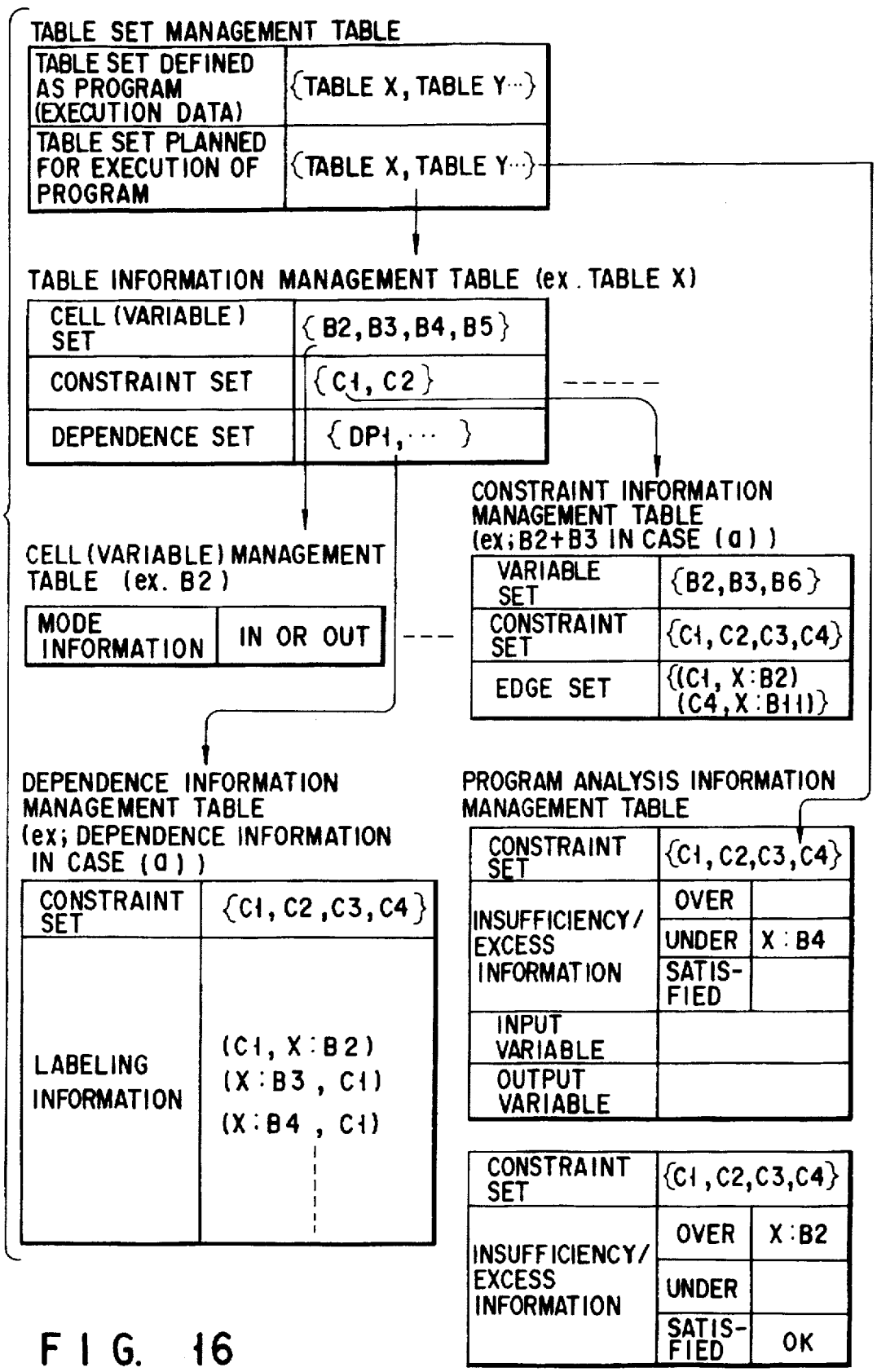
FIG. 16 is a view of tables representing the program analysis information generated in the program information analysis section.

In accordance with the flowchart shown in FIG. 15, a program information analysis section 17 generates a table set management table, a table information management table, a cell (variable) management table, a constraint information management table, a dependence information management table, and a program analysis information management table, each having a data structure as shown in FIG. 16, from the dependence information within each table stored in the dependence storage section 8 and the dependence information between tables stored therein. Since the flowchart of FIG. 15 is substantially the same as that of FIG. 5, its description is omitted. These tables are considered to be program analysis information and stored in a program analysis information storage section 16.

As shown in FIG. 16, the table set management table includes a row showing a table set defined as a program (execution data) and a row showing a planned table set used for execution of the program. The table information management table includes a row indicating a cell (variable) set including a table, a row indicating a constraint set defined in the table, and a row showing a dependence set, and is managed by a table name. The cell (variable) information management table includes a row indicating mode information. The constraint information management table includes of a row showing a variable set, a row showing a constraint set, and a row showing an edge set, and is managed by a constraint name. The program analysis information management table includes a row indicating a constraint set for generating a dependence and rows showing input and output variables, and is managed by an analysis information name. The dependence information management table includes a row showing a constraint set and a row showing labeling information.

Figure 18:
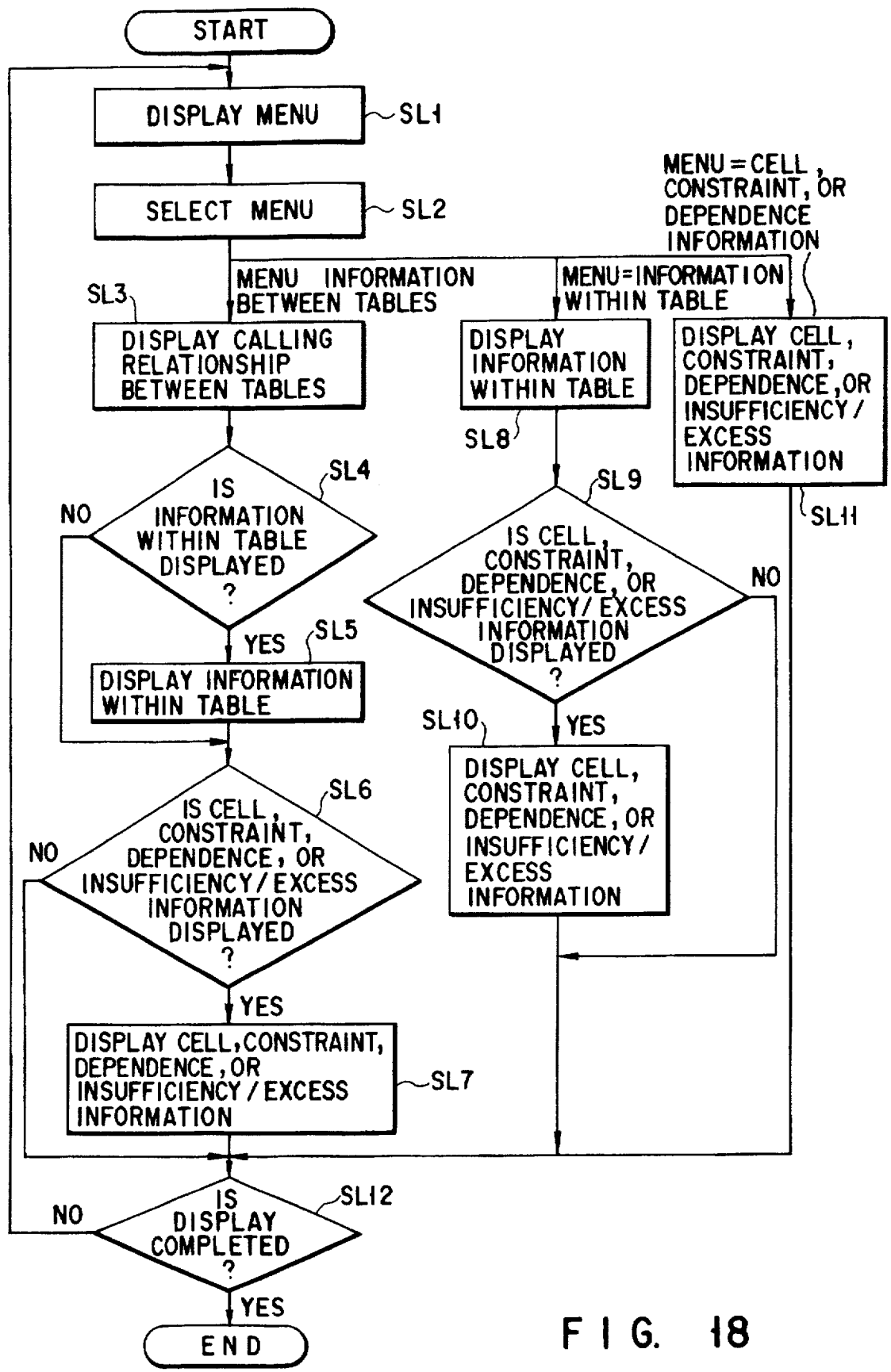
FIG. 18 is a flowchart showing a process of displaying the program analysis information in accordance with the display menu.

The program analysis information stored in the program analysis information storage section 16 is read out under control of an editing control section 2, when a user inputs a specific display command from an input section 1 while referring to menu information displayed on a display section, as shown in FIG. 17. The read-out information is displayed on the display section 4 as information indicative of the insufficiency/excess state of constraint information. Since this display operation is carried out in accordance with the flowchart of FIG. 18 which is substantially the same as that of FIG. 8, its description is omitted.

Figure 19:
FIG. 19 is a view of an example of displaying the insufficiency/excess state when an input value is given to a cell variable.

FIG. 19 shows an example of display of program analysis information between tables when input values are given to cell variables B2 and B3 in FIG. 3A or table X. According to this example, when input variables "X: B2" and "X: B3" are given as a result of analysis of the insufficiency/excess state, the constraint information can be satisfied without solving the constraint.

Figure 20:
FIG. 20 is a view of an example of displaying the insufficiency/excess state when an input value is given to another cell variable.

FIG. 20 shows an example of display of program analysis information between tables when input variables are given to cell variables B4 and B5 in FIG. 3B or table X. According to this example, when input variables "X: B4" and "X: B5" are given as a result of analysis of the insufficiency/excess state, the constraint information can be satisfied by solving the constraint or simultaneous equations.

FIG. 21 shows an example of displaying program analysis information between tables X and Y on the supposition that a cell variable B2 in table X is input information. According to this example, information on variables becomes insufficient if "X: B2" is provided as an input variable. In this case, a value needs to be given to a variable "X: B4" in order to satisfy the constraint. This need is displayed as display information when an underconstraint-based state is judged by the dependence information.

FIG. 22 shows an example of an overconstraint-based state in which the number of constraints is larger than that of variables whose values are not determined when cell variables B2, B4 and B5 of table X are supplied as input information. According to this example, whether an unchecked constraint node is redundant or contradictory is displayed as display information, or whether a variable supplied with an input value is redundant or contradictory is displayed as display information.

According to the second embodiment described above, when execution mode information indicative of an analysis mode is input from the input section 1, the editing control section 2 detects the input and informs the constraint readout section 11 of it. The section 11 collects the constraint information, as shown in FIG. 12, which is called by execution of programs. The constraint information is then converted to the bipartite graph, as shown in FIG. 13, by the constraint conversion section 12. The constraint analysis section 13 extracts the constraint information (FIGS. 14A and 14B), and the extracted information is regarded as dependence information and stored in the dependence storage section 8. The insufficiency/excess state analysis section 14 analyzes the insufficiency/excess state of constraint information using the dependence of constraint information between tables and within a table. The result of the analysis is stored in the program analysis information storage section 16, and displayed on the display section 4 in accordance with a user's request. Since the insufficiency/excess state of constraint information can be provided, the execution of interactive programs can easily be supported, and an efficient operation can be performed accordingly.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A computer program product for controlling a computer to execute a spreadsheet program using tables including a plurality of cells, the computer program product comprising:

first calculating means for obtaining a calculation flow among the plurality of cells based on an input value and a formula which serve as constraint conditions for each cell of the plurality of cells;

second calculating means for obtaining cell dependency information by using at least one of 1) formulas within a table including the plurality of cells and 2) formulas between a plurality of tables including the plurality of cells, according to the calculation flow obtained by the first calculating means;

generating means for generating information related to an execution flow within the table or between the plurality of tables based on the cell dependency information obtained by the second calculating means; and displaying means for displaying the information related to the execution flow generated by the generating means, wherein the second calculating means includes an inference engine which executes the constraint conditions as substitutions when the first calculating means succeeds in obtaining the calculation flow among the cells, and constraint processing means for solving the constraint conditions as simultaneous equations when the first calculating means fails to obtain the calculation flow.

2. The computer program product according to claim 1, wherein said generating means includes:

means for selecting one element from a table set defined as a program and for selecting one element from a table set used for execution of the program, means for, when said one element selected from the table set defined as the program is not an empty set, generating a table information management table, a cell information management table, and a constraint information management table of said one element, and means for, when said one element selected from the table set used for execution of the program is not an empty set, generating a table information management table, a cell information management table, a constraint information management table, and a dependence information management table of said one element.

3. The computer program product according to claim 2, wherein said table information management table is managed by a table name and includes a row indicative of a cell set defining a table, a row indicative of a constraint set defined in a table, and a row indicative of a dependence set, wherein said cell information management table is managed by a cell name and includes a row indicative of a cell value and a row indicative of mode information, wherein said constraint information management table is managed by a constraint name and includes a row indicative of a variable set, a row indicative of mode information, and a row indicative of direction information, and wherein said dependence information management table is managed by a dependence name and includes a row indicative of a constraint set for generating said dependency information and a row indicative of a variable set.

4. The computer program product according to claim 1, wherein said display means includes a display menu including:

information between tables including the table set defined as a program and the table set used for execution of the program, information within a table including cell, constraint and dependency information, cell information including a cell value and mode information, a constraint set including a variable set, mode information, and direction information, and a dependence set including a constraint set and a variable set.

5. The computer program product according to claim 4, wherein said display means includes:

means for, when the information between tables is selected from said display menu, displaying a calling relationship between the tables and displaying the information with at least one of a table and the cell, constraint or dependency information, means for, when the information within a table is selected from said display menu, displaying the information with at least one of a table and the cell, constraint or dependency information, and means for, when the cell, constraint or dependency information is selected from said display menu, displaying the selected information immediately.

6. The computer program product according to claim 1, wherein said information related to said execution flow which is displayed by said display means includes in sequence multiple cell variables to be input, constraint information between said multiple of cell variables, and cell variables obtained as a result of calculation based on the constraint information.

7. The computer program product according to claim 6, wherein said information related to said execution flow which is displayed by said display means includes multiple items of execution flow information representing a relationship between the tables.

8. The computer program product according to claim 1, wherein said information related to said execution flow which is displayed by said display means includes in sequence cell variables obtained as a result of calculation based on constraint information between multiple cell variables to be input, the constraint information, and said multiple cell variables to be input.

9. The computer program product according to claim 8, wherein said information related to said execution flow which is displayed by said display means includes multiple items of program execution process information representing a relationship between the tables.

10. A computer program product for controlling a computer to execute a spreadsheet program using tables including a plurality of cells, the computer program product comprising:

first calculating means for obtaining a calculation flow among the plurality of cells based on an input value and a formula which serve as constraint conditions for each cell of the plurality of cells;

second calculating means for obtaining cell dependency information by using at least one of 1) formulas within a table including the plurality of cells and 2) formulas between a plurality of tables including the plurality of cells, according to the calculation flow obtained by the first calculating means;

generating means for generating information related to an execution flow within the table or between the plurality of tables based on the cell dependency information obtained by the second calculating means;

third calculating means for obtaining insufficient/excess information of the constraint conditions determined within the table or between the plurality of tables based on the necessary input/output information obtained by the first calculating means and the cell dependency information obtained by the second calculating means; and displaying means for displaying the insufficient/excess information of the constraint conditions obtained by the third calculating means and the information related to the execution flow generated by the generating means, wherein the second calculating means includes an inference engine which executes the constraint conditions as substitutions when the first calculating means succeeds in obtaining the calculation flow among the cells, and constraint processing means for solving the constraint conditions as simultaneous equations when the first calculating means fails to obtain the calculation flow.

11. The computer program product according to claim 10, further comprising:

constraint conversion means for converting the necessary input/output information obtained by the first calculating means into a bipartite graph, wherein the second calculating means comprises means for labeling an edge of the bipartite graph by employing a predetermined rule to obtain the dependency information of the cells.

12. The computer program product according to claim 11, wherein said insufficiency/excess state analysis means comprises:

means for calculating a number of constraints and a number of cell variables based on the dependency information and checking a result of labeling, and means for analyzing an insufficiency/excess state of said constraint information set as to three cases where (a) the number of constraints and the number of cell variables are equal to each other, (b) the number of constraints is larger than the number of cell variables, and (c) the number constraints is smaller than the number of cell variables.

13. The computer program product according to claim 10, wherein said insufficiency/excess state analysis means includes:

means for selecting one element from a table set defined as a program and for selecting one element from a table set used for execution for the program, means for, when said one element selected from the table set defined as the program is not an empty set, generating a table information management table, a cell information management table, and a constraint information management table of said one element, and program information analysis means for, when said one element selected from the table set used for execution of the program is not an empty set, generating a table information management table, a cell information management table, a constraint information management table, and a program analysis information management table of said one element.

14. The computer program product according to claim 13, wherein said table information management table is managed by a table name and includes a row indicative of a cell set defining a table, a row indicative of a constraint set defined in a table, and a row indicative of a dependence set, wherein said cell information management table includes a row indicative of mode information, wherein said constraint information management table is managed by a constraint name and includes a row indicative of a variable set, a row indicative of a constraint set, and a row indicative of an edge set of a bipartite graph, wherein said dependence information management table includes a row indicative of a constraint set and a row indicative of labeling information, and wherein said program analysis information management table includes a row indicative of a constraint set for generating the dependency information, a row indicative of the insufficiency/excess state, and a row indicative of input/output variables.

15. The computer program product according to claim 10, wherein said display means includes a display menu including:

information between tables including a table set calling relationship defined as a program and a table set calling relationship planned for execution of the program, information within a table including cell, constraint and dependency information, cell information including a cell value and an input/output variable, a constraint set including a variable set, constraint information, and edge information, a dependence set including a constraint set and labeling information, and information of the insufficiency/excess state including an input/output variable set, a constraint set, and insufficiency/excess state information.

16. The computer program product according to claim 15, wherein said display means includes:

means for, when the information between tables is selected from said display menu, displaying a calling relationship between the tables and displaying the information with at least one of a table and the cell, constraint, dependency, or insufficiency/excess state information, means for, when the information within a table is selected from said display menu, displaying the information with at least one of a table and the cell, constraint, dependency, or insufficiency/excess state information, and means for, when the cell, constraint, dependency, or insufficiency/excess state information is selected from said display menu, displaying the selected information.

17. The computer program product according to claim 10, wherein said insufficiency/excess state displayed by said display means includes one of satisfaction of constraint, insufficiency of constraint, and excess of constraint, and wherein said display means displays variable information necessary for the satisfaction of constraint when the constraint is insufficient, and displays and removes excess constraint information when the constraint is excessive, thereby analyzing the program again and displaying a result of the analysis.

18. A computer-implemented method of controlling a computer to execute a spreadsheet program using tables including a plurality of cells, the method comprising the steps of:

a) obtaining a calculation flow among the plurality of cells based on an input value and a formula which serve as constraint conditions for each cell of the plurality of cells;

b) obtaining cell dependency information by using at least one of 1) formulas within a table including the plurality of cells and 2) formulas between a plurality of tables including the plurality of cells, according to the calculation flow obtained by the step a) of obtaining;

c) generating information related to an execution flow within the table or between the plurality of tables based on the cell dependency information obtained by the step b) of obtaining; and d) displaying the information related to the execution flow generated by the step c) of generating, wherein the step b) of obtaining includes the sub-steps of b1) executing the constraint conditions as substitutions when the step a) of calculating succeeds in obtaining the calculation flow among the cells, and b2) solving the constraint conditions as simultaneous equations when the step a) of calculating fails to obtain the calculation flow.

19. The method as claimed in claim 18, further comprising the steps of:

e) obtaining insufficient/excess information of the constraint conditions determined within the table or between the plurality of tables based on the cell dependency information; and f) displaying the insufficient/excess information of the constraint conditions.

* * * * *